(12) United States Patent  
Yoda et al.

(10) Patent No.: US 7,112,160 B2
(45) Date of Patent: Sep. 26, 2006

(54) AIR INTAKE SYSTEM FOR ENGINE

(75) Inventors: Ichirou Yoda, Shizuoka-ken (JP); Yuuji Oku, Shizuoka-ken (JP); Hirokazu Fujita, Shizuoka-ken (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 204 days.

(21) Appl. No.: 10/510,676

(22) PCT Filed: Jun. 6, 2003

(86) PCT No.: PCT/JP03/07239

§ 371 (c)(1),
(2), (4) Date: Oct. 6, 2004

(87) PCT Pub. No.: WO04/001209

PCT Pub. Date: Dec. 31, 2003

(65) Prior Publication Data

US 2005/0153816 A1    Jul. 14, 2005

(30) Foreign Application Priority Data

Jun. 19, 2002  (JP)  .............................. 2002-178279

(51) Int. Cl.
 *B60W 10/04* (2006.01)
 *F02D 9/10* (2006.01)
(52) U.S. Cl. ...................... 477/107; 123/336
(58) Field of Classification Search ........ 701/114; 123/336, 442, 342, 399, 583, 584; 477/107, 477/206, 203; 73/118.1
See application file for complete search history.

(56) References Cited

U.S. PATENT DOCUMENTS

| | | | | |
|---|---|---|---|---|
| 4,969,102 A | * | 11/1990 | Tamura et al. | 701/85 |
| 5,105,360 A | * | 4/1992 | Akiyama | 701/85 |
| 5,107,948 A | * | 4/1992 | Yamamoto | 180/197 |
| 5,151,861 A | * | 9/1992 | Danno et al. | 701/90 |
| 5,220,828 A | * | 6/1993 | Sodeno et al. | 73/118.1 |
| 5,403,247 A | * | 4/1995 | Yagi | 477/107 |
| 5,520,146 A | * | 5/1996 | Hrovat et al. | 123/336 |
| 5,541,844 A | * | 7/1996 | Ibaraki et al. | 701/102 |
| 6,581,567 B1 | * | 6/2003 | Deguchi | 123/336 |

FOREIGN PATENT DOCUMENTS

| | | |
|---|---|---|
| JP | 63-2839 | 1/1988 |
| JP | 05-149154 | 6/1993 |
| JP | 11-241636 | 9/1999 |

* cited by examiner

Primary Examiner—Dirk Wright
(74) Attorney, Agent, or Firm—Hogan & Hartson LLP

(57) ABSTRACT

In an intake system for an engine that includes plural throttle bodies 2 to 4 having throttle valves for changing an intake passage area, the plural throttle bodies 2 to 4 include manually driven side throttle bodies 2 to 4, which have manually driven side throttle valves 2b to 4b that are opened and closed by a throttle operation of a rider, and an electrically driven side throttle body 5, which has an electrically driven side throttle valve 5b that is opened and closed by an electric motor 11, and the intake system includes a valve opening control means 15 that controls an opening of the electrically driven side throttle valve 5b such that a specific output characteristic corresponding to an operating state of an engine is obtained.

20 Claims, 12 Drawing Sheets

AIR INTAKE SYSTEM FOR ENGINE

BACKGROUND OF THE INVENTION

1. Technical Field

The present invention relates to an intake system preferably applied to, for example, a multiple cylinder engine for a motorcycle.

2. Background Art

For example, a multiple cylinder engine mounted on a motorcycle includes an intake system of a multi-throttle type having one throttle body for each cylinder. As the intake system of this type, a manual intake system, in which a throttle grip and throttle valves are coupled mechanically by a throttle cable and all the throttle valves are opened and closed mechanically by a throttle grip rotating operation of a rider, is generally used.

On the other hand, recently, there has also been proposed an electric intake system in which an electric motor is coupled to throttle valves via a link mechanism or the like. A throttle grip rotating operation of a rider is detected and all the throttle valves are opened and closed by the electric motor according to this detected rotating operation.

Incidentally, in both the manual type and the electric type, the conventional intake system is constituted so as to control all the throttle valves to open and close uniformly in response to a throttle grip rotating operation of a rider. Therefore, for example, when the rider closes the throttle grip suddenly, all the throttle valves also close suddenly, whereby strong engine brake acts.

However, there is a demand that, depending upon a running state, for example at the time of approaching a corner or at the time of rising from the corner, for example, it is desired to make the engine brake slightly weak even in the case in which the throttle grip is closed suddenly or it is desired to make the rising of a torque slightly gentle even in the case the throttle grip is opened suddenly. In the conventional system, such a demand is coped with by a throttle grip rotating operation of a rider. However, this results in a problem requiring of an excessively high level driving operation from the rider.

The present invention has been devised in view of the conventional situation, and it is an advantage of the present invention to provide an intake system for an engine that can obtain an output characteristic corresponding to a running state without requiring a very high level driving operation from the rider.

SUMMARY OF THE INVENTION

According to an embodiment of the present invention, an intake system for an engine has plural throttle bodies having throttle valves for changing an intake passage area. The plural throttle bodies are constituted by include manually driven side throttle bodies having manually driven side throttle valves, which are opened and closed by a throttle operation of a rider. The plural throttle bodies also include an electrically driven side throttle body having an electrically driven side throttle valve, which is opened and closed by an electric motor and the intake system includes a valve opening control device that closes the electrically driven side throttle valve in a manner delayed by a first time constant within a range up to a predetermined regulated opening as the manually driven side throttle valves close.

The valve opening control device changes a delay by the first time constant at the time when the brake is actuated so as to be larger than the delay by the first time constant at the time when the brake is not actuated or changes the regulated opening at the time when the brake is actuated so as to be larger than a regulated opening at the time when the brake is not actuated.

The valve opening control device temporarily opens the electrically driven side throttle valve to a predetermined shift-down time opening at the time of shifting-down and subsequently closes the electrically driven side throttle valve in a manner delayed by a the first time constant.

An intake system for an engine includes plural throttle bodies having throttle valves for changing an intake passage area. The plural throttle bodies are constituted by manually driven side throttle bodies having manually driven side throttle valves, which are opened and closed by a throttle operation of a rider. The plural throttle bodies also includes an electrically driven side throttle body having an electrically driven side throttle valve, which is opened and closed by an electric motor. The intake system includes a valve opening control device, which controls an opening of the electrically driven side throttle valve such that a specific output characteristic corresponding to an operating state of an engine is obtained, and learns fully-closed positions of the manually driven side throttle valves and the electrically driven side throttle valve to make the fully-closed positions identical with each other when a speed is lower than a predetermined learning time speed. An opening of the manually driven side throttle valves is smaller than a predetermined learning time opening.

Here, the learning of the fully-closed positions is performed by, for example, in the case detected openings of the manually driven side and the electrically driven side throttle valves are larger than a fully-closed opening stored value, keeping the stored value as it is, and in the case the openings are smaller than the fully-closed opening stored value, updating the stored value.

The intake system learns a fully-closed position and a fully-opened position of the electrically driven side throttle valve and drives the electric motor only between the learned fully-closed position and fully-opened position.

An intake system for an engine includes plural throttle bodies having throttle valves for changing an intake passage area. The plural throttle bodies are constituted by manually driven side throttle bodies having manually driven side throttle valves, which are opened and closed by a throttle operation of a rider, and an electrically driven side throttle body having an electrically driven side throttle valve, which is opened and closed by an electric motor. The intake system includes a valve opening control device, which controls an opening of the electrically driven side throttle valve such that a specific output characteristic corresponding to an operating state of an engine is obtained, and includes a mechanical return mechanism that forcibly closes the electrically driven side throttle valve to a predetermined return opening as the manually driven side throttle valves close.

The intake system learns a return opening range, in which the electrically driven side throttle valve is forcibly closed by the return mechanism, and drives the electric motor only in an opening range excluding the learned return opening range.

An intake system for an engine includes plural throttle bodies having throttle valves for changing an intake passage area. The plural throttle bodies are constituted by manually driven side throttle bodies having manually driven side throttle valves, which are opened and closed by a throttle operation of a rider and an electrically driven side throttle body having an electrically driven side throttle valve, which is opened and closed by an electric motor. The intake system includes a valve opening control device that closes the electrically driven side throttle valve in a delayed manner as the manually driven side throttle valves close and changes a delay at the time when the brake is actuated so as to be larger than the delay at the time when the brake has not been actuated.

An intake system for an engine includes plural throttle bodies having throttle valves for changing an intake passage area. The plural throttle bodies are constituted by manually driven side throttle bodies having manually driven side throttle valves, which are opened and closed by a throttle operation of a rider and an electrically driven side throttle body having an electrically driven side throttle valve, which is opened and closed by an electric motor. The intake system includes a valve opening control device that closes the electrically driven side throttle valve in a delayed manner as the manually driven side throttle valves close and temporarily opens the electrically driven side throttle valve to a predetermined shift-down time opening at the time of shifting-down and subsequently closes the electrically driven side throttle valve later than the manually driven side throttle valves.

An intake system for an engine includes plural throttle bodies having throttle valves for changing an intake passage area. The plural throttle bodies are constituted by manually driven side throttle bodies having manually driven side throttle valves, which are opened and closed by a throttle operation of a rider, and an electrically driven side throttle body having an electrically driven side throttle valve, which is opened and closed by an electric motor. The intake system includes a valve opening control device that closes the electrically driven side throttle valve in a manner delayed within a range up to a predetermined regulated opening as the manually driven side throttle valves close.

The valve opening control device closes the electrically driven side throttle valve in a manner delayed by a first time constant as the manually driven side throttle valves close. The valve opening control device opens the electrically driven side throttle valve in a manner delayed by a second time constant as the manually driven side throttle valves open. The valve opening control device makes an opening of the electrically driven side throttle valve identical with an opening of the manually driven side throttle valves when a speed is lower than a predetermined control lower limit speed or a gear is in neutral.

DETAILED DESCRIPTION OF THE INVENTION

Embodiments of the present invention will be hereinafter explained on the basis of the attached drawings.

Figure 1:
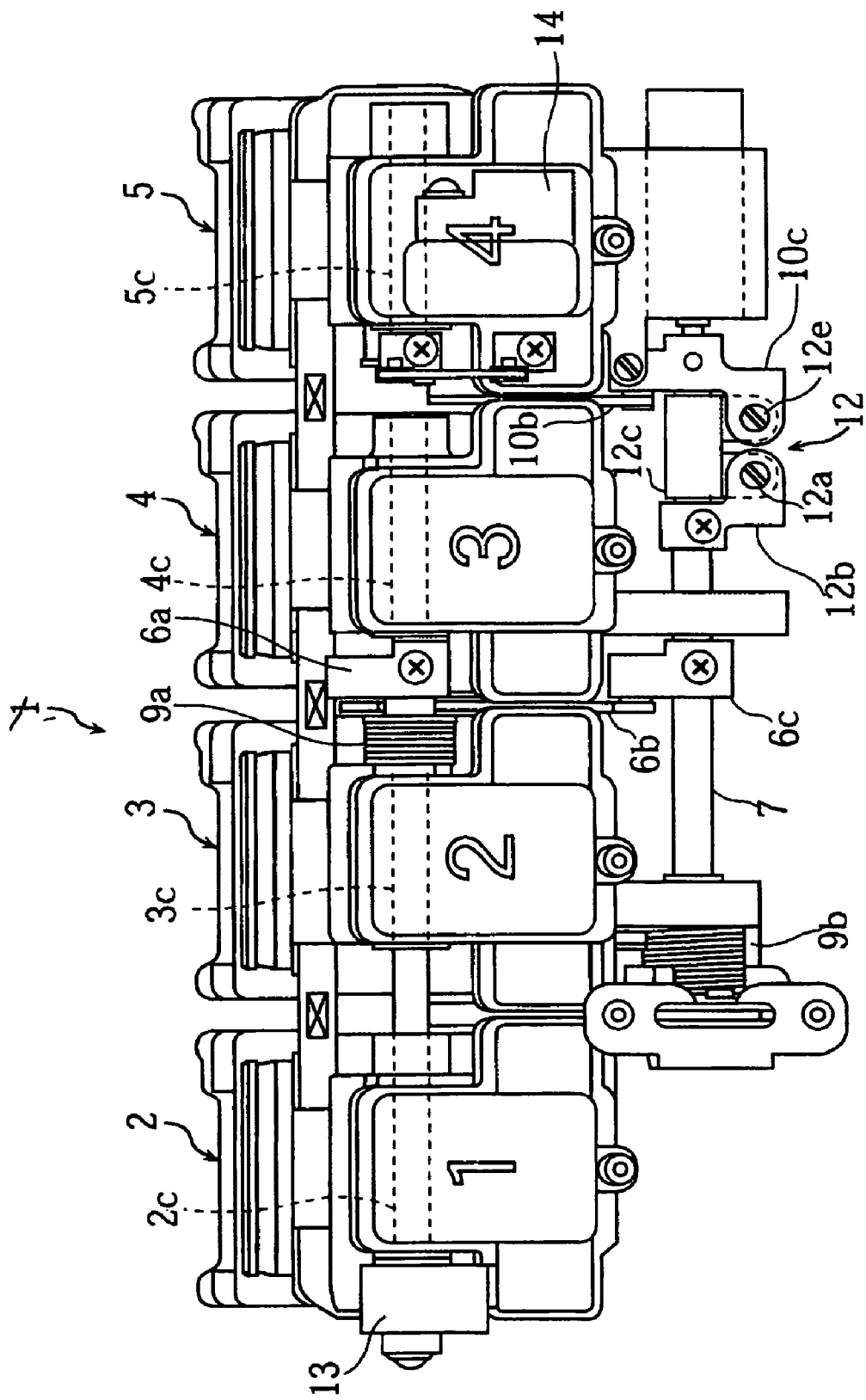
FIG. 1 is a plan view showing a carburetor unit of a fuel feed system according to an embodiment of the present invention.
Figure 2:
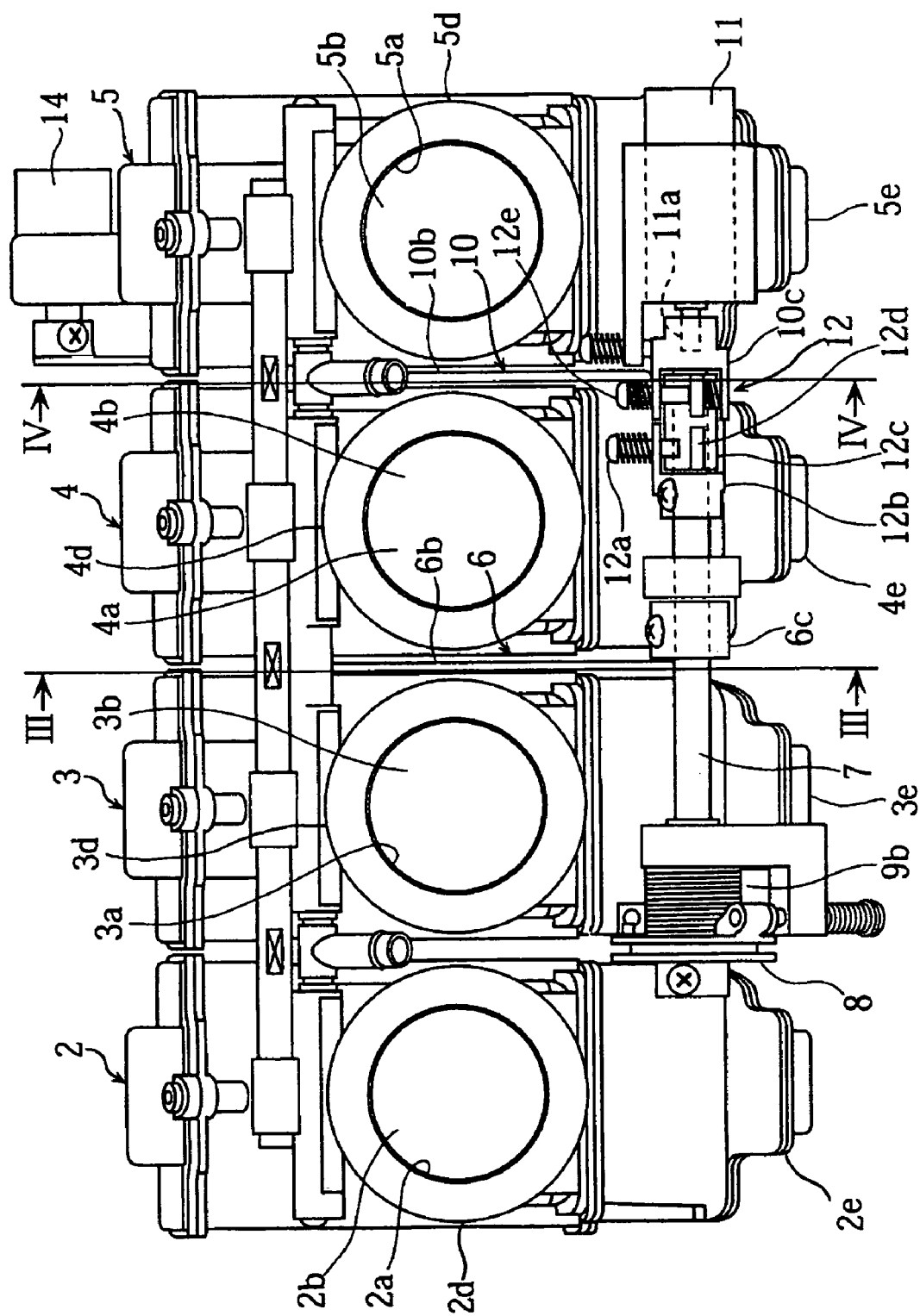
FIG. 2 is a front view of the carburetor unit.
Figure 3:
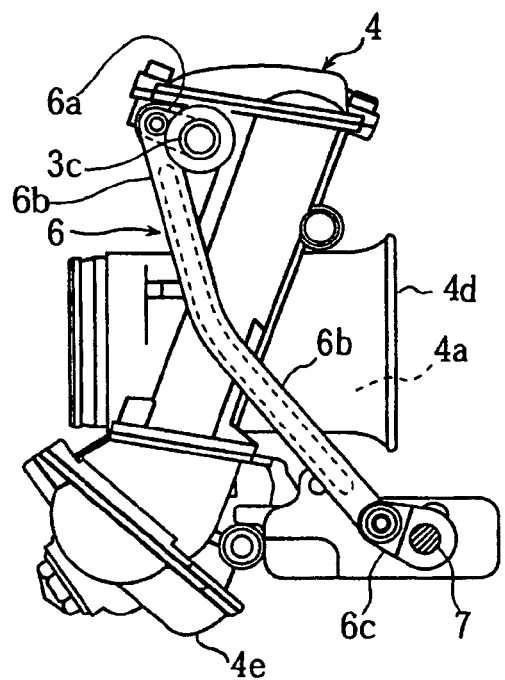
FIG. 3 is a sectional side view (sectional view along line III—III in FIG. 2) of the carburetor unit.
Figure 4:
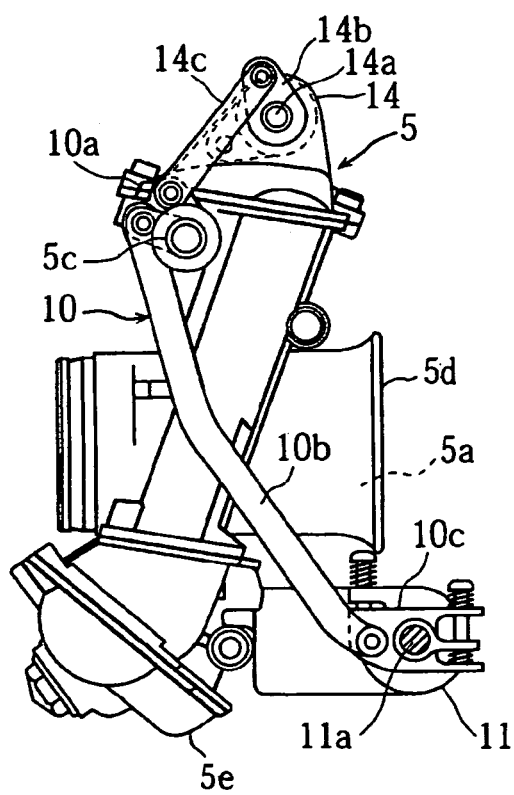
FIG. 4 is a sectional side view (sectional view along line IV—IV in FIG. 2) of the carburetor unit.
Figure 5:
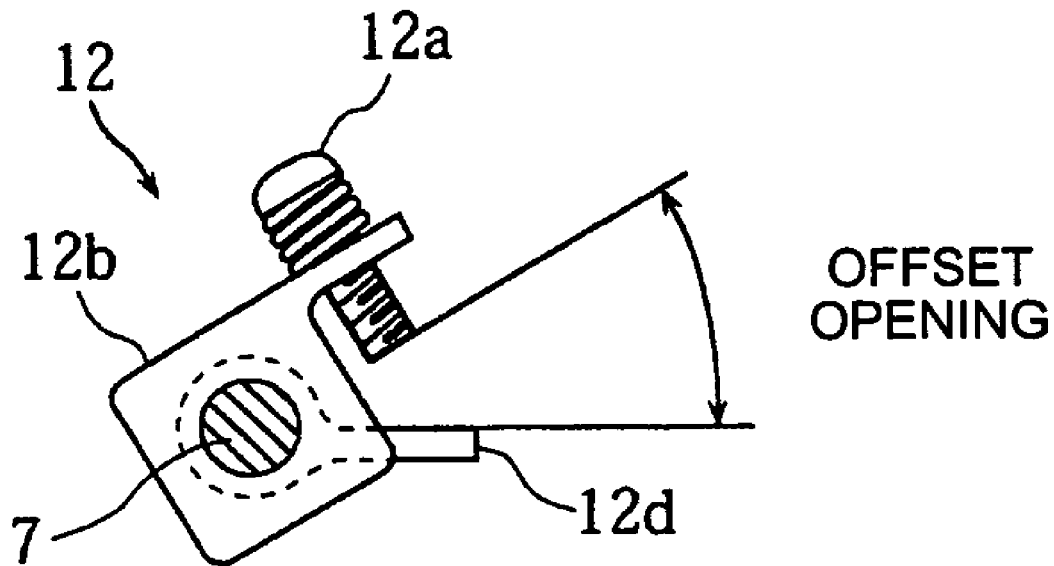
FIG. 5 is a sectional side view of a main part of the carburetor unit.
Figure 6:
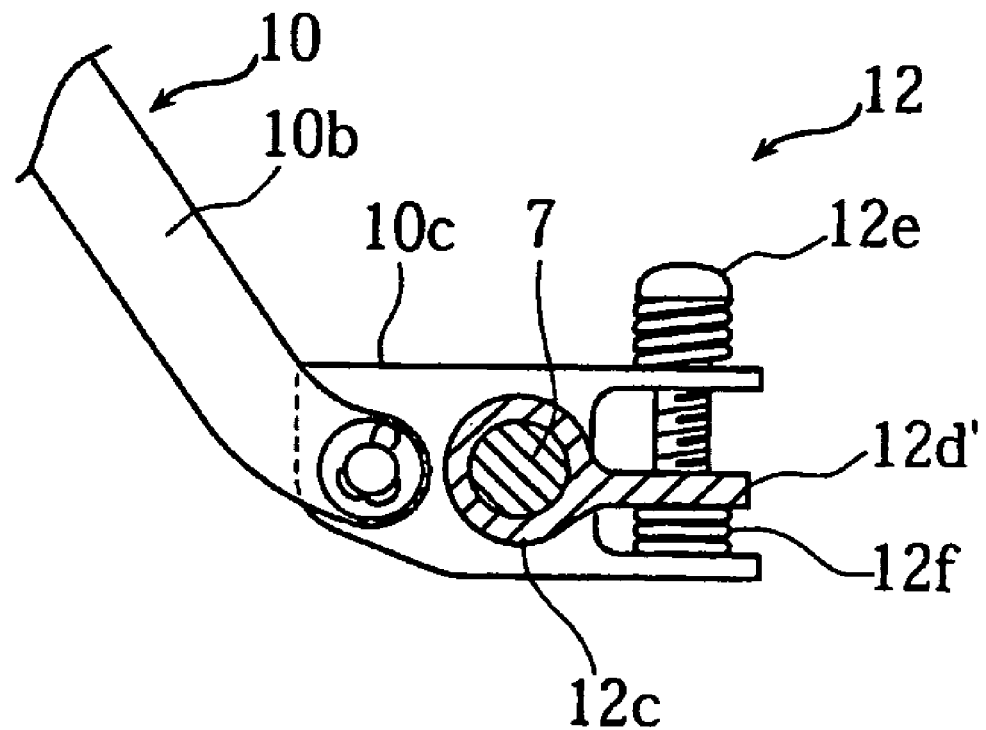
FIG. 6 is a sectional side view of the main part of the carburetor unit.
Figure 11:
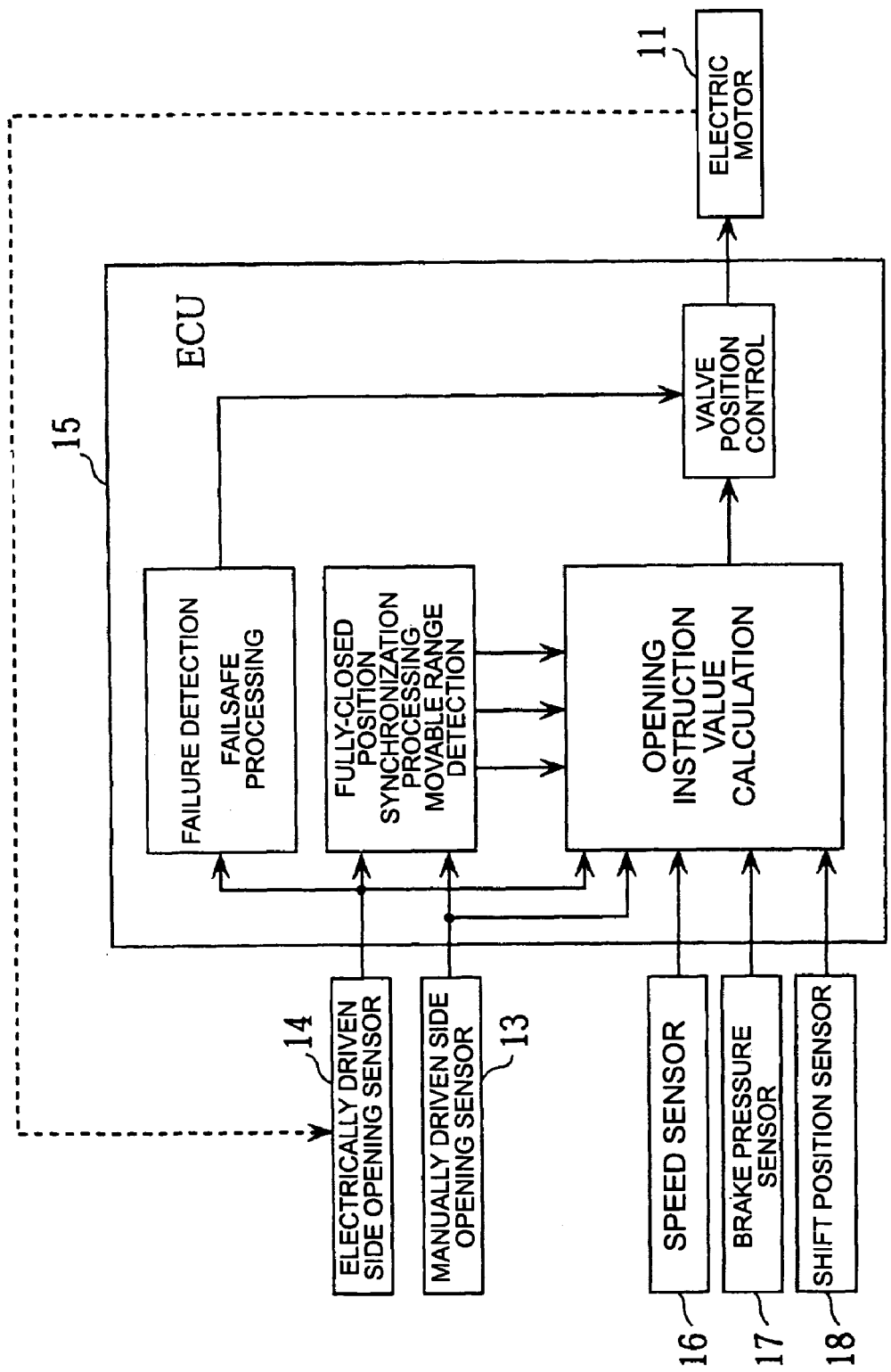
FIG. 11 is a block diagram of the fuel feed system according to an embodiment of the present invention.
Figure 12:
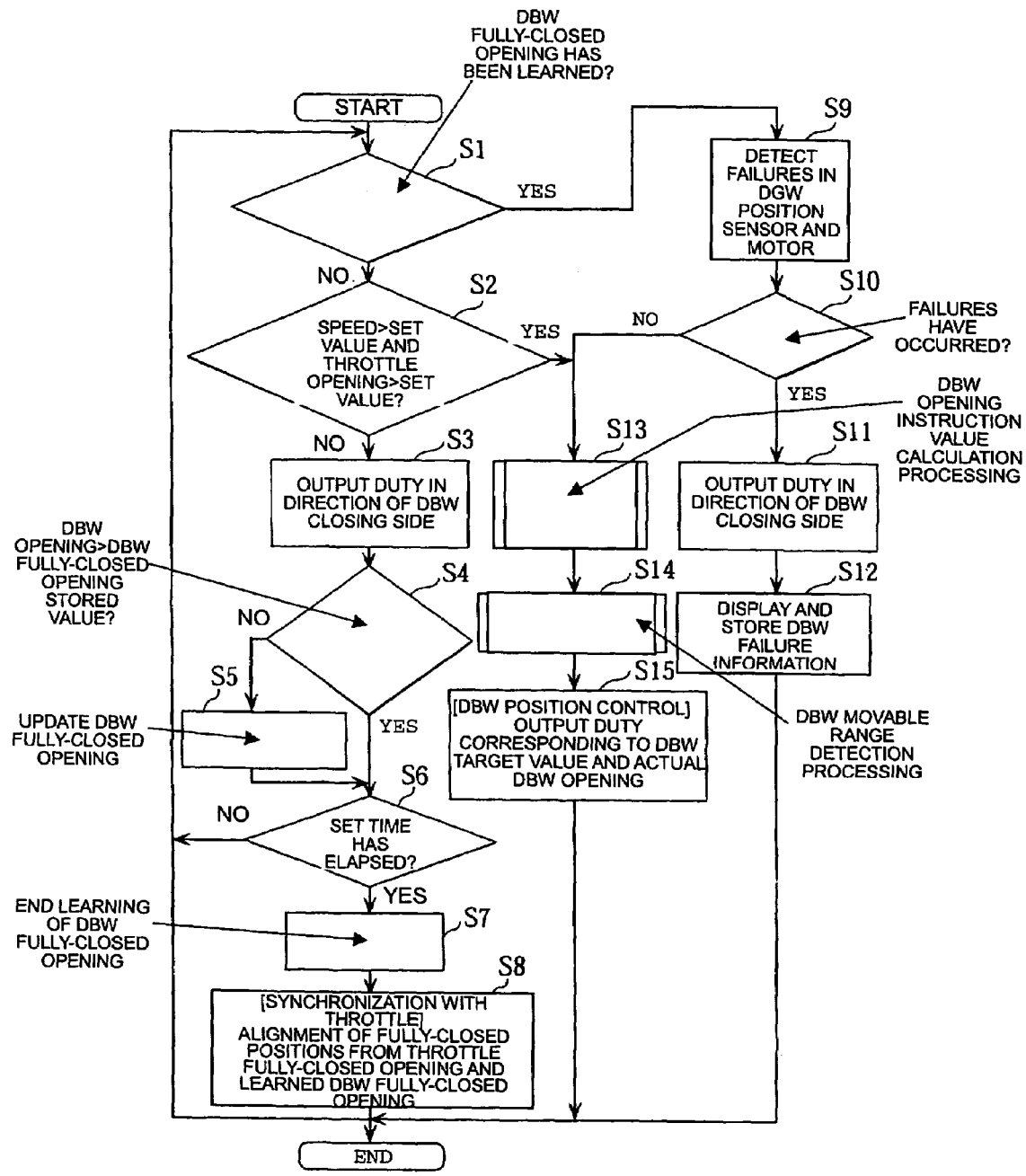
FIG. 12 is a flowchart for explaining operations of the fuel feed system.
Figure 13:
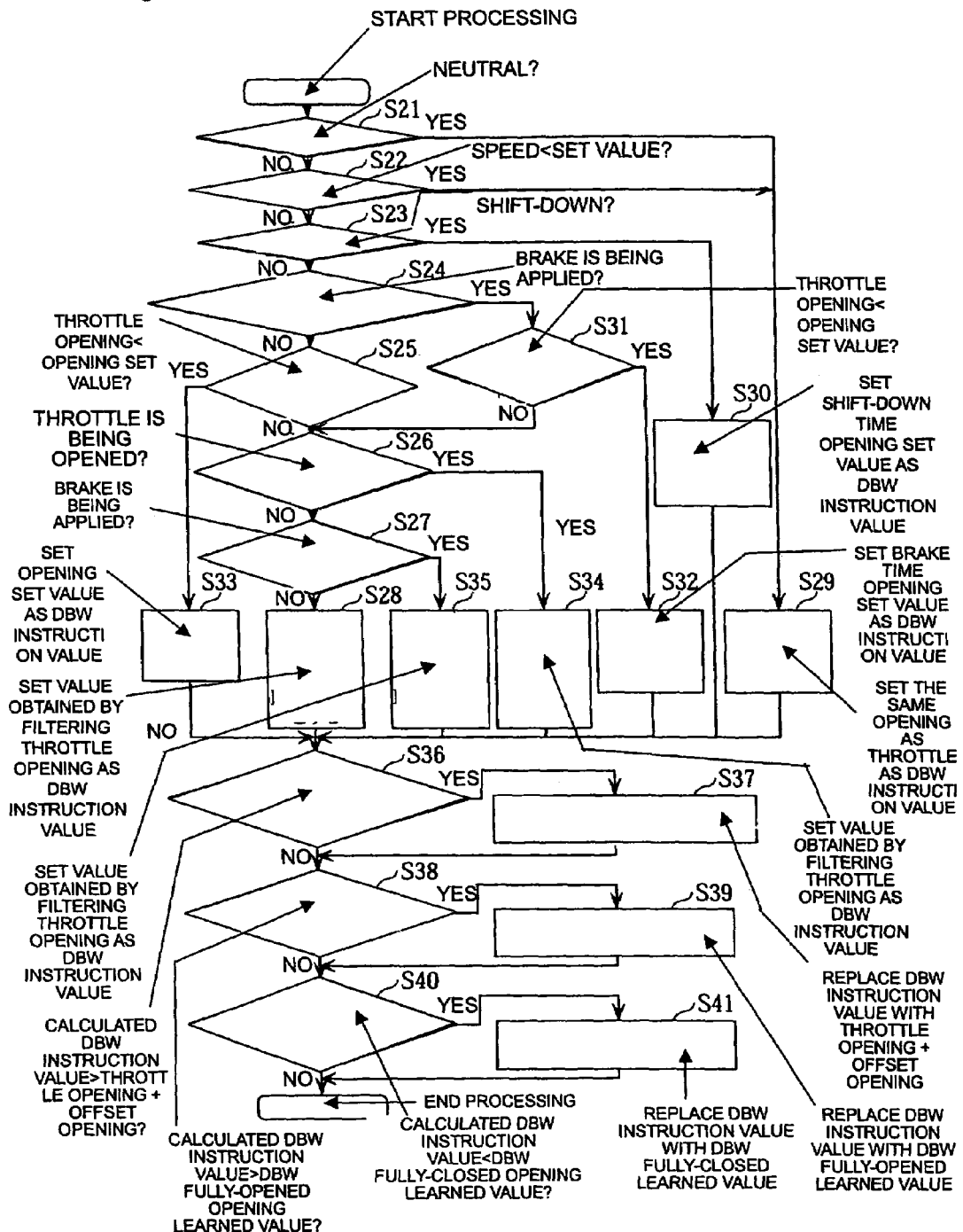
FIG. 13 is a flowchart for explaining operations of the fuel feed system.
Figure 14:
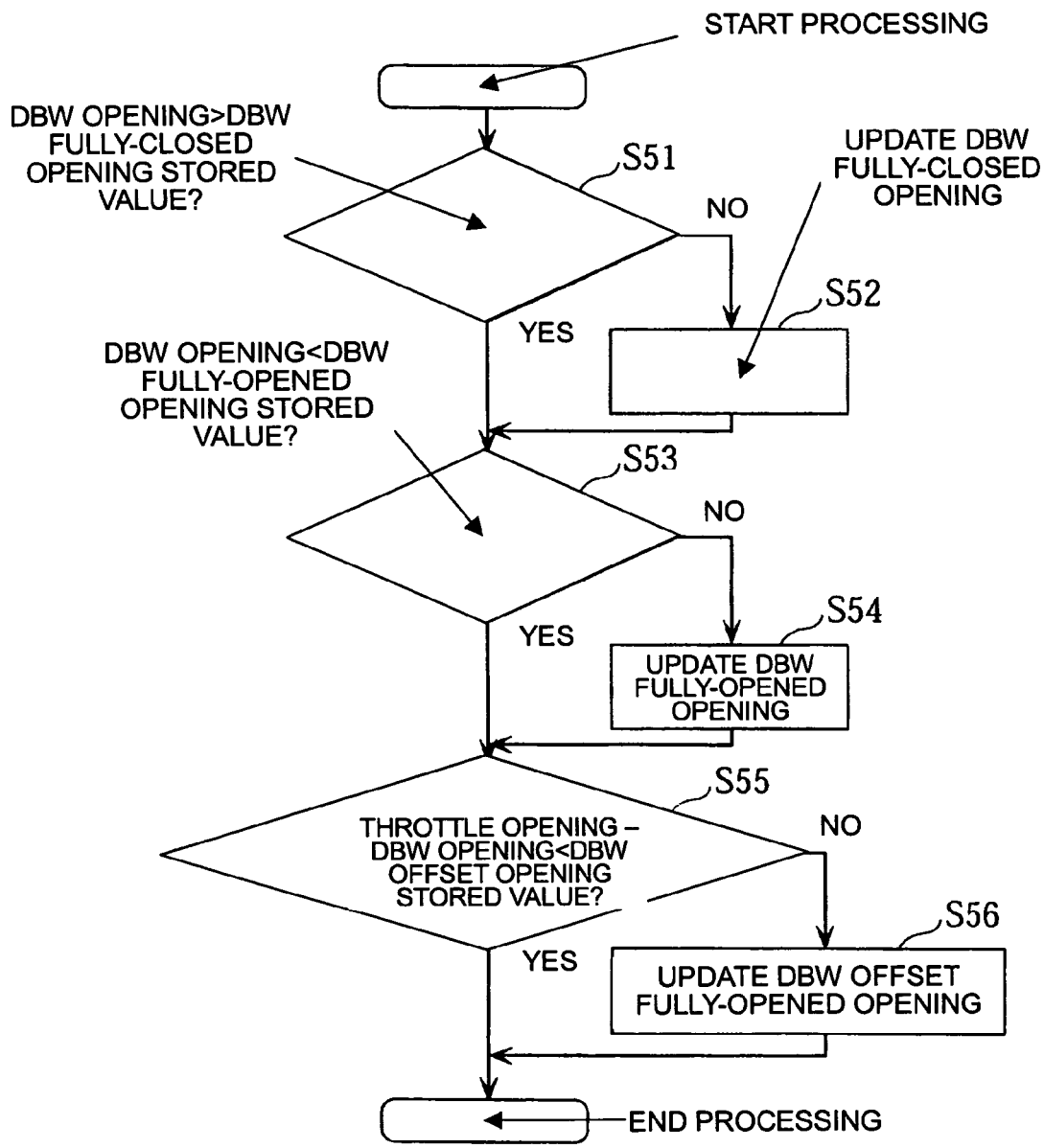
FIG. 14 is a flowchart for explaining operations of the fuel feed system.

FIGS. 1 to 14 are diagrams for explaining an intake system for a motorcycle engine according to an embodiment of the present invention. FIGS. 1 and 2 are a plan view and a front view of the intake system, FIGS. 3 and 4 are sectional side views of the intake system, FIGS. 5 and 6 are enlarged views of the main parts, FIGS. 7 to 10 are characteristic charts of a throttle opening for explaining various operations, FIG. 11 is a block diagram, and FIGS. 12 to 14 are flowcharts for explaining the operations.

In FIGS. 1 to 6, reference numeral 1 denotes a carburetor unit constituting a hardware portion of the intake system of this embodiment. This carburetor unit 1 is formed by integrally combining first to fourth carburetors 2 to 5, which are connected to intake manifolds of first to fourth cylinders, with bolting.

The respective carburetors 2 to 5 are formed by integrally combining first to fourth throttle valves 2b to 5b of a slide type that open and close to control passage areas of Venturi passages (intake passages) 2a to 5a, throttle bodies 2d to 5d incorporating the first to the fourth throttle valves 2b to 5b, and float chambers 2e to 5e. Valve shafts 2c to 5c, which slide the respective throttle valves 2b to 5b, form an identical straight line. The valve shafts 2c to 4c of the first to the third carburetors 2 to 4 are coupled to one another so as to rotate simultaneously, and the valve shaft 5c of the fourth carburetor 5 is adapted to rotate independently. In addition, a biasing spring 9a, which biases the valve shafts 2c to 4c of the first to the third carburetors 2 to 4 to rotate to a fully-closed position, is disposed between the second carburetor 3 and the third carburetor 4.

The valve shafts 2c to 4c of the first to the third carburetors are coupled to a drive shaft 7 via a link mechanism 6. Specifically, this link mechanism 6 has a structure in which an arm 6a fixed to the valve shaft 3c and an arm 6c fixed to the drive shaft 7 are coupled by a bar-like link 6b so as to be rotatable relatively.

A throttle pulley 8 is mounted at the left end in FIG. 2 of the drive shaft 7 via an opening adjustment mechanism 9b so as to rotate with the drive shaft 7. Although not shown in the figure, the throttle pulley 8 is coupled to a throttle grip, which is mounted on a steering handle, by a throttle cable.

With the above-mentioned structure, when a rider rotates the throttle grip, the throttle valves 2b to 4b of the first to the third carburetors 2 to 4 synchronize to open and close the Venturi passages 2a to 4a. In this way, the throttle bodies 2d to 4d of the first to the third carburetors 2 to 4 serve as manually driven side throttle bodies in which throttle valves are driven to open and close by a manual rotational operation of the throttle grip by the rider. Therefore, according to circumstances, the first to the third throttle valves 2b to 4b are referred to as manually driven side throttle valves in this embodiment.

In addition, the valve shaft 5c of the fourth carburetor 5 is coupled to an output shaft 11a of an electric motor 11 via a link mechanism 10. Specifically, this link mechanism 10 has a structure in which an arm 10a fixed to the valve shaft 5c and an arm 10c fixed to the output shaft 11a are coupled by a bar-like link 10b so as to be rotatable relatively.

Consequently, the throttle valve 5b of the fourth carburetor 5 opens and closes the Venturi passage 5a according to the rotation of the electric motor 11. In this way, the throttle body 5d of the fourth carburetor 5 serves as an electrically driven side throttle body in which a throttle valve is driven to open and close by the electric motor 11. Therefore, in this embodiment, according to circumstances, the fourth throttle valve 5b is referred to as an electrically driven side throttle valve.

Further, the drive shaft 7 and the output shaft 11a of the electric motor 11 are coupled by a mechanical return mechanism 12 that forcibly closes the electrically driven side throttle valve 5b within a predetermined return opening range (e.g., 50 degrees) following a closing operation of the manually driven side throttle valves 2b to 4b.

The return mechanism 12 has a detailed structure described below. A link member 12b implanted with a pressing bolt 12a is fixed at the right end of the drive shaft 7, and a cylindrical transmission member 12c is mounted further on a tip side of the drive shaft 7 more than the link member 12 so as to be rotatable relatively. A pressing piece 12d is protrudingly provided in the transmission member 12c so as to be able to be pressed by the pressing volt 12a. Moreover, a pressing piece 12d, which is protrudingly provided in the transmission member 12c, is coupled to the arm 10c of the link mechanism 10 via a transmission bolt 12e and a spring 12f.

Here, FIGS. 5 and 6 show a state in the case in which the first to the fourth throttle valves 2b to 5b are in a fully-opened state. In this case, an offset opening of about 30 degrees is formed between the pressing bolt 12a and the pressing piece 12d. Thus, the pressing bolt 12a does not come into abutment against the pressing piece 12d while the manually driven side throttle valves 2b to 4b close about 30 degrees from a fully opened position. Therefore, it is not until the manually driven side throttle valves 2b to 4b rotate about 30 degrees or more from the fully opened position that the transmission member 12c also rotates. This rotation starts to forcibly close the electrically driven side throttle valve 5b from the pressing piece 12d via the arm 10c, the link 10b, and the arm 10a. In addition, the electrically driven side throttle valve 5b is still located at a position with a return opening of about 45% at a point when the manually driven side throttle valves 2b to 4b are fully closed.

In addition, a manually driven side openings 13, which detects an opening of the throttle valve 2b, is mounted at the left end in FIG. 1 of the valve shaft 2c of the manually driven side throttle valve 2b of the first carburetor 2.

Moreover, an electrically driven side opening sensor 14, which detects an opening of the electrically driven side throttle valve 5b, is disposed on an upper end face of the fourth carburetor 5. An arm 14b is attached to an input shaft 14a of this electrically driven side opening sensor 14. The arm 14b is coupled to the arm 10a of the link mechanism 10 via a link 14c so as to be rotatable relatively.

As shown in FIG. 11, the system of this embodiment includes an ECU 15 that functions as an opening control device for the electrically driven side throttle valve 5b. Detection signals from the manually driven side opening sensor 13, the electrically driven side opening sensor 14, a speed sensor 16, a brake pressure sensor 17, and a shift position sensor 18 are inputted to this ECU 15. The ECU 15 calculates an opening instruction value of the electrically driven side throttle valve 5b according to a vehicle drive state and outputs a control signal for realizing the opening instruction value to the electric motor 11.

In addition, the ECU 15 has a failsafe processing function for performing failure detection for a valve drive mechanism by an electric motor on the basis of the detection signals, a synchronizing processing function for learning fully-closed positions of the manually driven side throttle valves and the electrically driven throttle valve to make both the fully-closed positions identical, and a movable range detection processing function for learning fully opened and fully-closed positions of the electrically driven side throttle valve 5b and a return opening by the return mechanism 12 and performing electrically driven side throttle valve driving by the electric motor 11 only within the learned opening range.

Next, operations as well as actions and advantages of the system of this embodiment will be explained.

Figure 7:
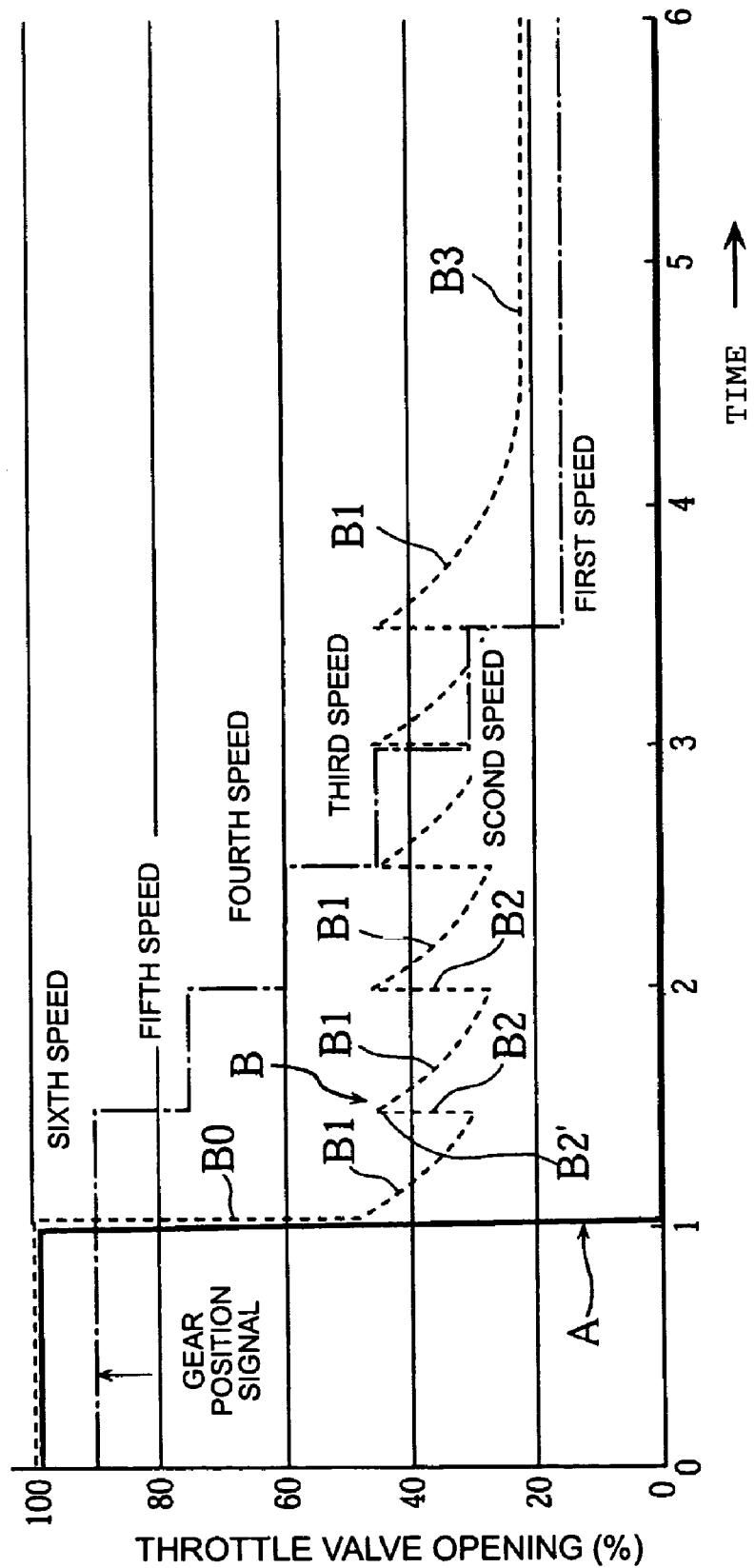
FIG. 7 is a throttle valve opening characteristic chart of the fuel feed system.

In the system of this embodiment, while a motorcycle is running with a throttle grip fully opened (all throttle valves fully opened) and in a state of a shift position in a sixth speed, in the case in which a rider fully closes the throttle grip suddenly and changes the shift position from the sixth speed to a fifth speed, . . . , a first speed to decelerate the motorcycle, throttle valve opening control shown in FIG. 7 is performed. The manually driven side throttle valves 2b to 4b are fully closed immediately (actually, about 0.05 seconds are necessary as described later) by the throttle grip fully closing operation (see the characteristic curve A). On the other hand, the electrically driven side throttle valve 5b is forcibly closed in the vicinity of an opening 45% with a delay of a very short time by the function of the return mechanism 12 (see B0 of the characteristic curve B). Thereafter, the electrically driven side throttle valve 5b is closed in a manner delayed by a first time constant by the function of the ECU 15 (see B1 of the characteristic curve B), temporarily opened to a shift-down time opening (e.g., about 45%, B2' of the characteristic curve B) when the motorcycle is decelerated from the sixth speed to the fifth speed, closed again in a manner delayed by the first time constant, and finally regulated to a regulated opening equivalent to about 20% of the full open (see B3 of the characteristic curve B).

Note that it is needless to mention that various modifications can be adopted for the characteristic curve B1 by selecting the first time constant appropriately. In addition, various modifications can also be adopted for the shift-down time opening and the regulated opening.

Figure 8:
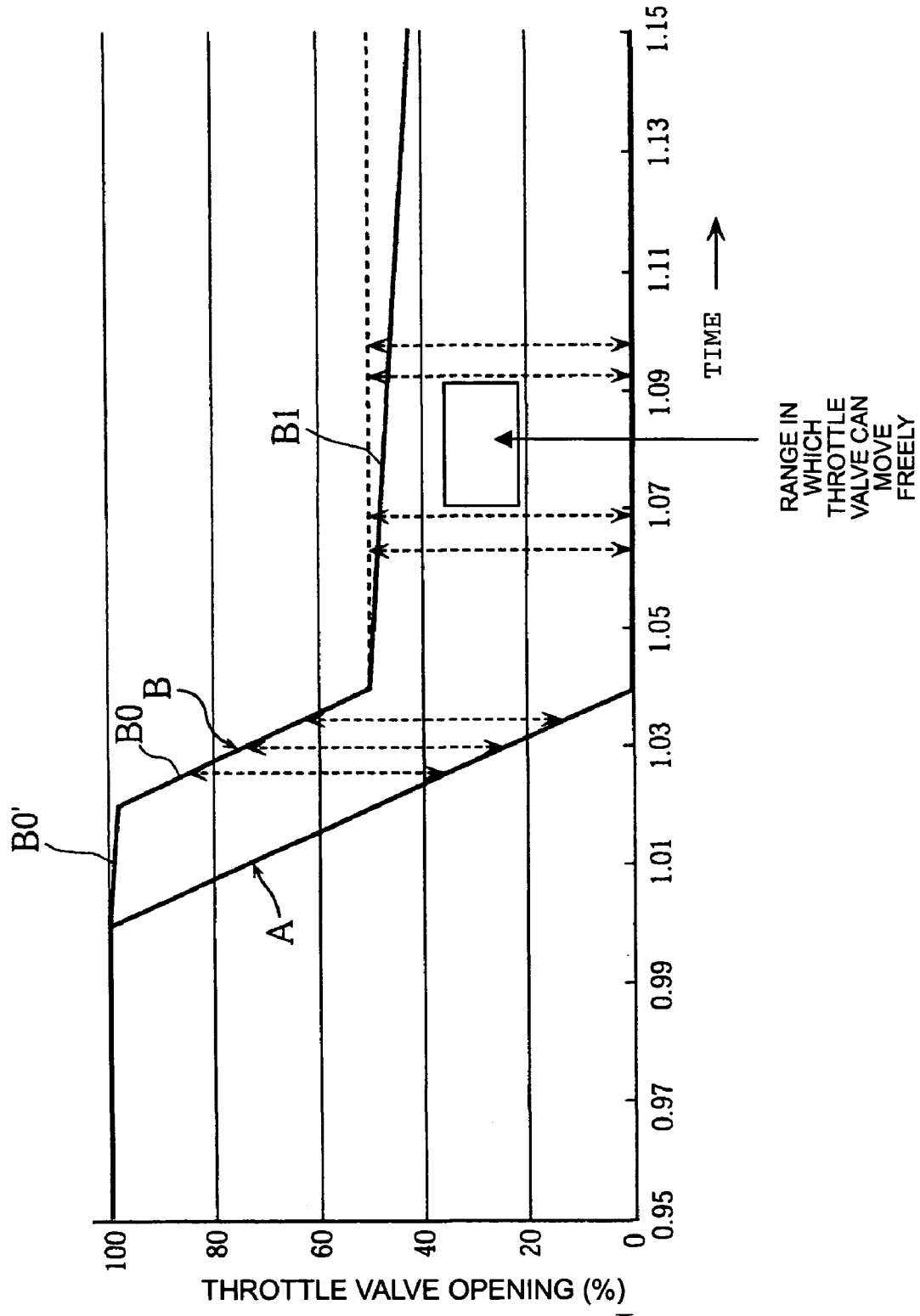
FIG. 8 is a throttle valve opening characteristic chart of the fuel feed system.

FIG. 8 shows an instance when the throttle grip is closed in enlargement (with a time axis extended). That is, when the manually driven side throttle valves 2b to 4b start closing as the throttle grip is closed, according to an elapse of time corresponding to the offset opening (transmission free range) in the return mechanism 12 (see B0' in FIG. 8), the electrically driven side throttle valve 5b also starts closing. When the manually driven side throttle valves are fully closed, the electrically driven side throttle valve has an opening of about 45%. Here, the forcible closing operation ends, and after that, the electrically driven side throttle vale closes in a manner delayed by the first time constant (slowly) according to the control of the ECU 15.

Figure 9:
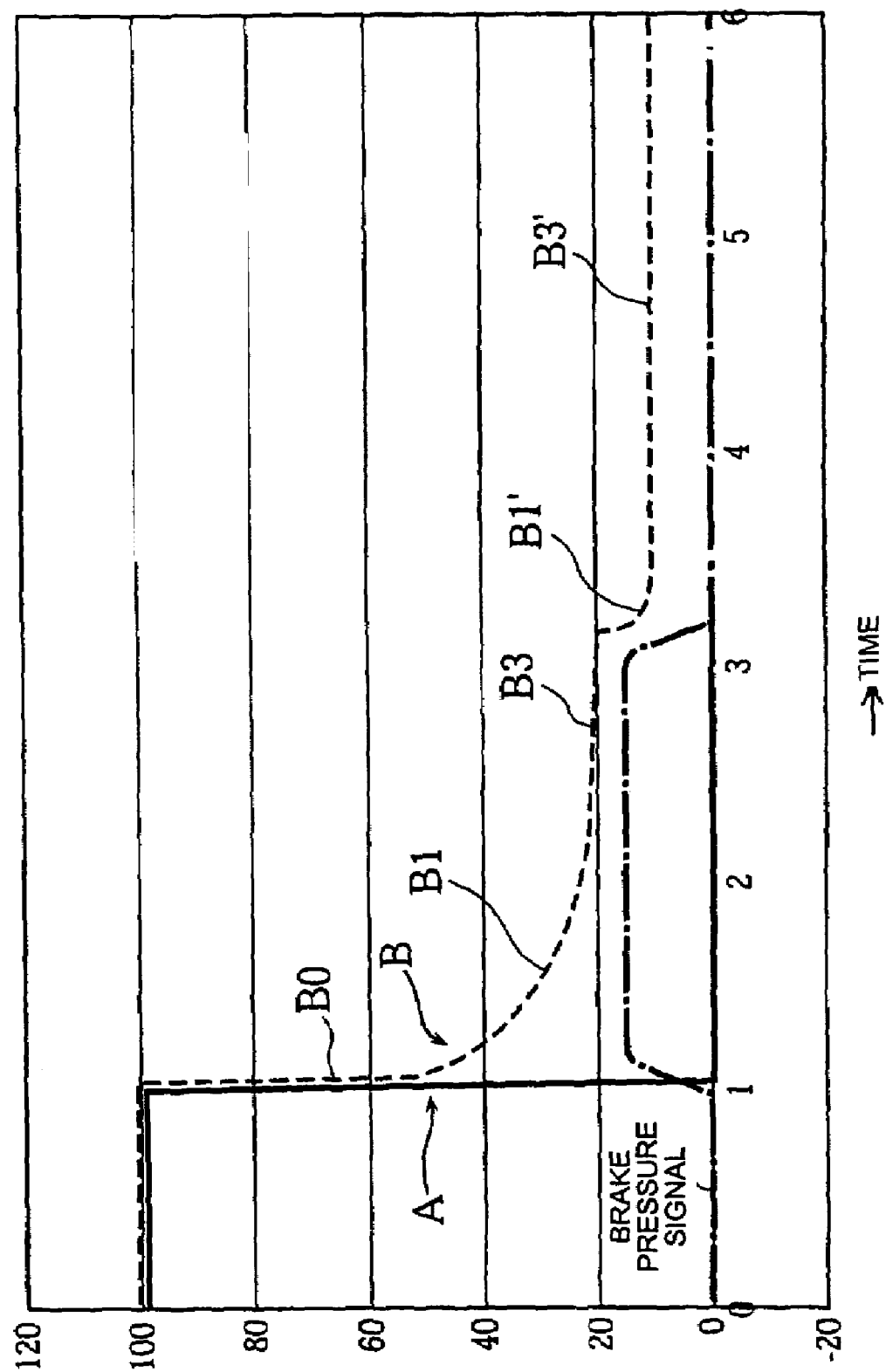
FIG. 9 is a throttle valve opening characteristic chart of the fuel feed system.

The ECU 15 is adapted to change the first time constant and the regulated opening according to a driving condition. FIG. 9 shows a state in which the first time constant and the regulated opening are changed from the time when the brake is actuated to the time when the brake is not actuated.

A delay by the first time constant (B1) at the time when the brake is actuated (when a brake pressure signal of a front wheel braking device is equal to or higher than a predetermined threshold value) is changed so as to be larger than a delay by a time constant (B1') at the time when the brake is not actuated (a brake pressure signal is lower than the threshold value), that is, such that the electrically driven side throttle valve closes more slowly at the time of braking than at the time of non-braking. In addition, the regulated opening (B3) at the time when the brake is actuated is changed so as to be larger than a regulated opening (B3') at the time of non-actuation.

Figure 10:
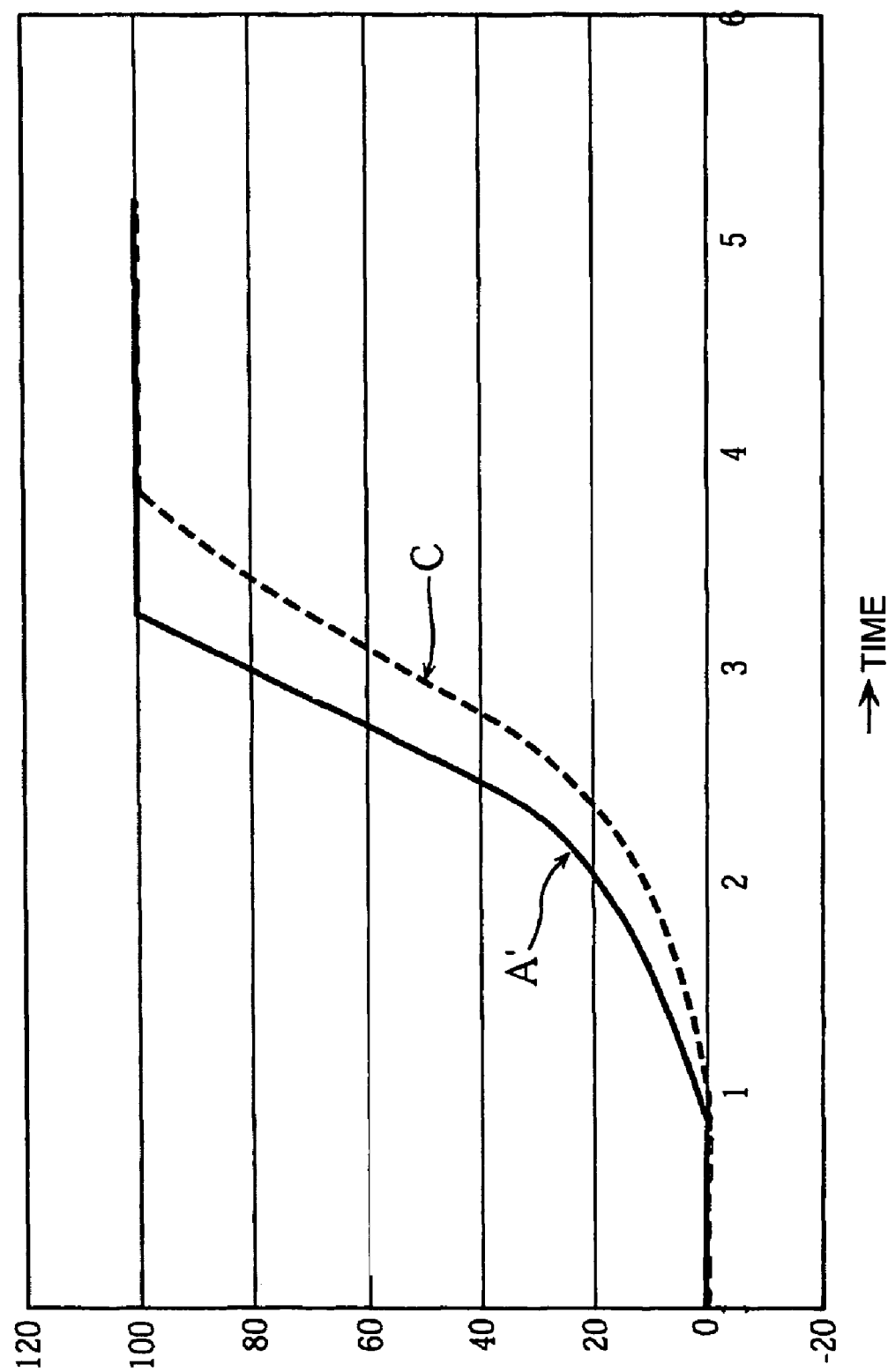
FIG. 10 is a throttle valve opening characteristic chart of the fuel feed system.

Moreover, as indicated by a characteristic curve A' in FIG. 10, the ECU 15 is adapted to open the electrically driven side throttle valve 5b in a manner delayed by a second time constant as the manually driven side throttle valves 2b to 4b open, that is, at the time of acceleration (see a characteristic curve C in FIG. 10). Note that it is needless to mention that various modifications can be adopted as the characteristic curve C by selecting the second time constant appropriately.

A control operation for a fuel feed system by the ECU 15 will be explained on the basis of flowcharts in FIGS. 12 to 14. Note that, in FIGS. 12 to 14, DBW means the electrically driven side throttle valve, and throttle means the manually driven side throttle valves.

First, an operation for alignment of fully-closed positions for the manually driven side and the electrically driven side throttle valves will be explained on the basis of FIG. 12. When a the program begins, in the case in which an opening at the time of a full closure of the electrically driven side throttle valve (DBW) has not been learned (step S1), it is judged whether a speed does not exceed a set value (learning time lower limit speed) and an opening of the manually driven throttle valves exceeds a set value (learning time lower limit opening) (step S2). If both the speed and the manually driven side throttle valve opening do not exceed the set values, that is, if the speed is sufficiently low and the throttle opening is sufficiently small, the ECU 15 outputs a duty in a direction for closing the electrically driven side throttle valve (step S3). If the detected opening of the electrically driven side throttle valve is larger than a fully-closed opening stored value of the valve, the ECU 15 keeps the stored value as it is, and if the opening of the electrically driven side throttle valve is smaller than the fully-closed opening stored value, the ECU 15 updates the fully-closed opening stored value to the detected value (steps S4 and S5). When a predetermined set time elapses, the ECU 15 ends fully-closed opening learning for the electrically driven side throttle valve (steps S6 and S7). Then, the ECU 15 performs alignment of fully-closed positions on the basis of the manually driven side throttle valve fully-closed opening and the learned fully-closed opening of the electrically driven side throttle valve (step S8).

If the fully-closed opening of the electrically driven side throttle valve has been learned in step S1, the ECU 15 performs failure detection for the electrically driven side opening sensor and the electric motor (step S9). If failures have occurred, the ECU 15 outputs a duty in a direction for closing the electrically driven side throttle valve, and stores and displays information on these failures (steps S10 to S12).

In addition, if at least one of the vehicle speed and the throttle opening is larger than the set values in step S2, and if no failure has occurred in step S10, the ECU 15 performs instruction value calculation processing for an electrically driven side throttle valve and movable range detection processing for the electrically driven side throttle valve to be described later and outputs a duty corresponding to a difference between the instruction value and the detection value of the electrically driven side throttle valve (steps S13 to S15).

Next, the opening instruction value calculation processing for the electrically driven side throttle valve 5b will be explained on the basis of FIG. 13. When a program for the processing begins, if a shift position of a transmission is not neutral (step S21), a vehicle speed is not equal to or lower than the set value (control lower limit speed) (step S22), a shift-down operation is not being performed (step S23), a brake is not being actuated (step S24), an electrically driven side throttle valve opening is not smaller than the regulated opening (B3) (step S25), a throttle valve is not being opened (step S26), and the brake is not being applied again (step S27), that is, a motorcycle is running at a constant speed normally, the ECU 15 sets a value obtained by applying a predetermined filter to the detected opening of the manual side throttle valves, that is, the opening, which is obtained by delaying the opening of the manual side throttle valves by the first time constant (B1), as the opening instruction value of the electrically driven side throttle valve (step S28).

If the shift position is neutral in step S21, and if the speed is lower than the control lower limit speed in step S22, the ECU 15 sets the same opening as the manually driven side throttle valve opening as the electrically driven side throttle valve opening instruction value (step S29). If the shift-down operation is performed in step S23, the ECU 15 sets the shift-down time opening set value (B2' in FIG. 7) as the opening instruction value of the electrically driven side throttle valve (step S30).

In addition, if the brake is being applied in step S24, and when the detected manually driven side throttle valve opening is smaller than the brake time regulated opening (see B3 in FIG. 9), the ECU 15 sets the regulated opening as the opening instruction value of the electrically driven side throttle valve (steps S31 and S32). When the detected manually driven side throttle valve opening is not smaller than the brake time regulated opening, the ECU 15 returns to step S26.

Further, if the manually driven side throttle valve opening is smaller than the regulated value (see B3 in FIG. 7) in step S25, the ECU 15 sets this regulated value as the opening instruction value of the electrically driven side throttle valve (step S33).

Moreover, if the manually driven side throttle valve is being opened in step S26, the ECU 15 sets an opening, which is obtained by delaying the detected manually driven side throttle valve opening by the second time constant (an opening obtained by filtering the manually driven side throttle valve opening, see the curve C in FIG. 10), as the opening instruction value of the electrically driven side throttle valve (step S34). If the brake is being applied in step S27, the ECU 15 sets an opening, which is obtained by delaying by the detected manually driven side throttle valve opening by the brake actuation time constant (B1 in FIG. 9) (an opening obtained by filtering the manually driven side throttle valve opening), as the instruction value (step S35).

Then, the ECU 15 compares the instruction value calculated by each of the steps with a sum of the manually driven side throttle vale opening and the offset opening. If the instruction value is not larger than this sum, the ECU 15 sets the calculated value as the instruction value directly, and if the instruction value is larger than the sum, the ECU 15 replaces the instruction value with this sum (steps S36 and S37).

In addition, the ECU 15 compares the calculated instruction value with the fully-opened opening learned value of the electrically driven side throttle valve. If the instruction value is not larger than this learned value, the ECU 15 sets the calculated value as the instruction value directly, and if the instruction value is larger than this learned value, the ECU 15 replaces the instruction value with the learned value (steps S38 and S39).

Moreover, the ECU 15 compares the calculated instruction value with the fully-closed side learned value of the electrically driven side throttle valve. If the instruction value is not smaller than this learned value, the ECU 15 sets the calculated value as the instruction value directly, and if the instruction value is smaller than this learned value, the ECU 15 replaces the instruction value with the learned value (steps S40 and S41).

Detection processing for a movable range of the electrically driven side throttle valve will be explained on the basis of FIG. 14. First, a detected electrically driven side throttle valve opening is compared with a fully-closed opening stored value of the electrically driven side throttle valve. If the detected value is larger than the stored value, the stored value is not changed, and if the detected value is not larger (is smaller) than the stored value, the stored value is replaced with the detected value (steps S51 and S52).

Next, the detected electrically driven side throttle valve opening is compared with a fully-opened opening stored value of the electrically driven side throttle valve. If the detected value is smaller than the stored value, the stored value is not changed, and if the detected value is not smaller (is larger) than the stored value, the stored value is replaced with the detected value (steps S53 and S54).

Subsequently, a difference between the detected manually driven side throttle valve opening and the electrically driven side throttle valve opening is compared with an offset opening stored value of the electrically driven side throttle valve. If the difference is smaller than the stored value, the stored value is not changed, and if the difference is not smaller (is larger) than the stored value, the offset opening stored value is replaced with this difference (steps S53 and S54).

As described above, in this embodiment, an opening of the electrically driven side throttle valve 5b is controlled such that a specific output characteristic corresponding to an operating state of an engine is obtained. Thus, an output characteristic of an engine corresponding to a driving condition can be obtained without requiring a rider of an excessively high level driving operation, and a driving operation can be facilitated.

More specifically, the electrically driven side throttle valve 5b is closed in a manner delayed by the first time constant (see B1 in FIG. 7) as the manually driven side throttle valves 2b to 4b close according to a throttle grip operation of the rider and not closed exceeding the regulated opening (B3 in FIG. 7). Thus, even in the case in which the rider closes the throttle grip suddenly, the electrically driven side throttle valve 5b closes later than the throttle grip operation, and generation of the engine brake can be controlled so much more for that. Therefore, the rider is not required an excessively high level driving operation, and a driving operation is facilitated.

In addition, the first time constant at the time when the brake is actuated (B1 in FIG. 9) is changed to a time constant that makes the delay larger than that of the time constant at the time when the brake is not actuated (B1' in FIG. 9), and the regulated opening at the time when the brake is actuated (B3) is changed so as to be larger than the regulated opening at the time when the brake is not actuated (B3'). Thus, in the case in which the rider actuates the brake device, generation of the engine brake is controlled stronger than in the case in which the rider does not actuate the brake device, and a driving operation can be facilitated.

It is said that, in general, or depending upon the preference of the driving operation of the rider, driving is easier when the engine brake is not generated much in the case in which a brake is applied strongly. In this embodiment, the system can cope with such a situation as well.

The electrically driven side throttle valve 5b is temporarily opened to a predetermined shift-down time opening (B2' in FIG. 7) and subsequently closed in a manner delayed by the first time constant (B1). Thus, shock due to a sudden increase in engine braking at the time of shifting-down can be eased, and driving can be facilitated.

In addition, the electrically driven side throttle valve 5b is opened in a manner delayed by a second time constant (see a characteristic curve C in FIG. 10) as the manually driven side throttle valves 2b to 4b open. Thus, even in the case in which a rider opens the throttle grip suddenly, excessively steep rising of an engine torque can be controlled, and a driving operation can be facilitated.

Further, an opening of the electrically driven side throttle valve 5b is made identical with an opening of the manually driven side throttle valves 2b to 4b when a vehicle speed is lower than a predetermined control lower limit speed or when a gear is in neutral. Thus, it is possible to avoid unnecessary control in a driving range in which special control for a throttle valve opening is not originally required as at the time of low-speed running or neutral, and a control mechanism can be simplified.

Moreover, the intake system learns fully-closed positions of the manually driven side throttle valves 2b to 4b and the electrically driven side throttle valve 5b, and the fully-closed positions are made identical with each other according to this learned value. Thus, even if there is an error between the manually driven side throttle opening sensor 13 and the electrically driven side throttle opening sensor 14, both the throttle valves can be synchronized, and control accuracy can be improved.

The intake system learns a fully-closed position and a fully-opened position of the electrically driven side throttle valve 5b and drives the electric motor 11 only between the learned fully-closed position and fully opened position. Thus, the problem in that the electrically driven side throttle valve 5b is driven exceeding the fully-closed position and the fully-opened position can be avoided, and breakage due to further energization in a lock state of the electric motor 11 can be avoided.

The intake system further includes the mechanical return mechanism 12 that forcibly closes the electrically driven side throttle valve 5b to a predetermined return opening as the manually driven side throttle valves 2b to 4b close. Thus, control by the electric motor 11 is also unnecessary for the electrically driven side throttle valve 5b up to the return opening, and control for an opening of the electrically driven throttle valve can be simplified.

Moreover, the intake system learns a return opening range, in which the electrically driven side throttle valve 5b is forcibly closed by the return mechanism 12, and drives the electric motor 11 only in an opening range excluding this return opening range. Thus, lock breakage of the electrically driven side throttle valve 5b caused by driving the electric motor 11 in the forcible return range can be avoided.

Note that, although the intake system of the carburetor type is explained in the embodiment, the present invention can also be applied to an intake system of a fuel injection type. In addition, although the case in which throttle bodies are formed separately and combined by a bolt is described, it is also possible to form all or a part of the throttle bodies integrally.

The electrically driven side throttle valve is closed in a delayed manner as the manually driven side throttle valves close. Thus, even in the case in which a rider closes the throttle grip suddenly, the electrically driven side throttle valve closes later than a throttle grip operation, and generation of the engine brake can be controlled so much more for that.

In addition, in the case in which the electrically driven side throttle valve is closed in a delayed manner as the manually driven side throttle valves close, the electrically driven side throttle valve is closed in a range up to a predetermined regulated opening. Thus, generation of the engine brake can be controlled more surely.

A delay at the time when the brake is actuated is changed so as to be larger than the delay at the time when the brake is not actuated or the regulated opening at the time when the brake is actuated is changed so as to be larger than a regulated opening at the time when the brake is not actuated. Thus, in the case in which a rider actuates a brake device, generation of the engine brake is controlled more strongly than in the case in which the rider does not actuate the brake device, and a driving operation can be further facilitated. It is said that, in general, or depending upon the preference in the driving operation of the rider, driving is easier when the engine brake is not generated much in the case in which a brake is applied strongly. The present invention can facilitate driving in such a case.

The electrically driven side throttle valve is temporarily opened to a predetermined shifting-down time opening at the time of shifting-down and subsequently closed later than the manually driven side throttle valves. Thus, a sudden increase in the engine brake at the time of shifting-down can be controlled, and shock at the time of shifting-down can be eased to facilitate driving.

The intake system learns fully-closed positions of the manually driven side throttle valves and the electrically driven side throttle valve when a speed is lower than a predetermined learning time speed and an opening of the manually driven side throttle valves is smaller than a predetermined learning time opening. Thus, the learning of the fully-closed positions can be performed surely. In addition, the fully-closed positions are made identical with each other according to the learned value, whereby even if there is an error between a manually driven side throttle opening sensor and an electrically driven side throttle opening sensor, both the throttle valves can be synchronized, and control accuracy can be improved.

The intake system learns a fully-closed position and a fully-opened position of the electrically driven side throttle valve and drives the electric motor only between the learned fully-closed position and fully-opened position. Thus, lock breakage of the electric motor, which is caused by driving the electrically driven side throttle valve exceeding the fully-closed position and the fully-opened position, can be avoided.

The intake system further includes a mechanical return mechanism that forcibly closes the electrically driven side throttle valve to a predetermined return opening as the manually driven side throttle valves close. Thus, control by the electric motor is also unnecessary for the electrically driven side throttle valve up to the return opening, and control for an opening of the electrically driven throttle valves can be simplified.

The intake system drives the electric motor only in an opening range excluding a return opening range in which the electrically driven side throttle valve is forcibly closed by the return mechanism. Thus, lock breakage of the electric motor can be avoided.

In the case in which a rider actuates a brake device, generation of the engine brake is controlled more strongly than in the case in which the rider does not actuate the brake device, and a driving operation can be further facilitated.

Shock due to a sudden increase in the engine brake at the time of shifting-down can be eased, and driving can be facilitated.

Even in the case in which a rider closes the throttle grip suddenly, the electrically driven side throttle valve closes later than a throttle grip operation, and generation of the engine brake can be controlled so much more for that. Therefore, the rider is not required of an excessively high level driving operation, and a driving operation is facilitated.

Even in the case in which a rider opens the throttle grip suddenly, excessively steep rising of an engine torque can be controlled, and a driving operation can be facilitated.

It is possible to avoid unnecessary control in a driving range in which special control for a throttle valve opening is not originally required as at the time of low-speed running or neutral, and a control mechanism can be simplified.

The invention claimed is:

1. An intake system for an engine, comprising:
    plural throttle bodies constituted by manually driven side throttle bodies having manually driven side throttle valves, which are opened and closed by a throttle operation of a rider;
    an electrically driven side throttle body having an electrically driven side throttle valve, which is opened and closed by an electric motor; and
    a valve opening control means for closing an opening of the electrically driven side throttle valve in a manner delayed by a first time constant within a range up to a predetermined regulated opening as the manually driven side throttle valves close.

2. The intake system for an engine, according to claim 1, wherein the valve opening control means changes a delay by the first time constant at a time when a brake is actuated so as to be larger than the delay by the first time constant at a time when the brake is not actuated or changes a regulated opening at the time when the brake is actuated so as to be larger than a regulated opening at the time when the brake is not actuated.

3. The intake system for an engine according to claim 1, wherein the valve opening control means temporarily opens the electrically driven side throttle valve to a predetermined shift-down time opening at a time of shifting-down and subsequently closes the electrically driven side throttle valve in a manner delayed by the first time constant.

4. The intake system for an engine according to claim 1, wherein the engine includes plural throttle bodies having throttle valves for changing an intake passage area.

5. An intake system for an engine, comprising:
    plural throttle bodies constituted by manually driven side throttle bodies having manually driven side throttle valves, which are opened and closed by a throttle operation of a rider;

an electrically driven side throttle body having an electrically driven side throttle valve, which is opened and closed by an electric motor; and a valve opening control means, which controls an opening of the electrically driven side throttle valve such that a specific output characteristic corresponding to an operating state of an engine is obtained, and learns fully-closed positions of the manually driven side throttle valves and the electrically driven side throttle valve to make the fully-closed positions identical with each other when a speed is lower than a predetermined learning time speed and an opening of the manually driven side throttle valves is smaller than a predetermined learning time opening.

6. The intake system for an engine according to claim 5, wherein the intake system learns a fully-closed position and a fully-opened position of the electrically driven side throttle valve and drives the electric motor only between the learned fully-closed position and fully-opened position.

7. The intake system for an engine according to claim 5, wherein the engine includes plural throttle bodies having throttle valves for changing an intake passage area.

8. An intake system for an engine, comprising:
plural throttle bodies constituted by manually driven side throttle bodies having manually driven side throttle valves, which are opened and closed by a throttle operation of a rider;
an electrically driven side throttle body having an electrically driven side throttle valve, which is opened and closed by an electric motor; and
a valve opening control means, which controls an opening of the electrically driven side throttle valve such that a specific output characteristic corresponding to an operating state of an engine is obtained, and includes a mechanical return mechanism that forcibly closes the electrically driven side throttle valve to a predetermined return opening as the manually driven side throttle valves close.

9. The intake system for an engine according to claim 8, wherein the intake system learns a return opening range, in which the electrically driven side throttle valve is forcibly closed by the return mechanism, and drives the electric motor only in an opening range excluding the learned return opening range.

10. The intake system for an engine according to claim 8, wherein the engine includes plural throttle bodies having throttle valves for changing an intake passage area.

11. An intake system for an engine, comprising:
plural throttle bodies constituted by manually driven side throttle bodies having manually driven side throttle valves, which are opened and closed by a throttle operation of a rider;
an electrically driven side throttle body having an electrically driven side throttle valve, which is opened and closed by an electric motor; and
a valve opening control means that closes the electrically driven side throttle valve in a delayed manner as the manually driven side throttle valves close and changes a delay at a time when the brake is actuated so as to be larger than the delay at a time when the brake is not actuated.

12. The intake system for an engine according to claim 11, wherein the engine includes plural throttle bodies having throttle valves for changing an intake passage area.

13. An intake system for an engine, comprising:
plural throttle bodies constituted by manually driven side throttle bodies having manually driven side throttle valves, which are opened and closed by a throttle operation of a rider;
an electrically driven side throttle body having an electrically driven side throttle valve, which is opened and closed by an electric motor; and
a valve opening control means that closes the electrically driven side throttle valve in a delayed manner as the manually driven side throttle valves close and temporarily opens the electrically driven side throttle valve to a predetermined shift-down time opening at a time of shifting-down and subsequently closes the electrically driven side throttle valve later than the manually driven side throttle valves.

14. The intake system for an engine according to claim 13, wherein the engine includes plural throttle bodies having throttle valves for changing an intake passage area.

15. An intake system for an engine, comprising:
plural throttle bodies constituted by manually driven side throttle bodies having manually driven side throttle valves, which are opened and closed by a throttle operation of a rider;
an electrically driven side throttle body having an electrically driven side throttle valve, which is opened and closed by an electric motor; and
a valve opening control means that closes the electrically driven side throttle valve in a manner delayed within a range up to a predetermined regulated opening as the manually driven side throttle valves close.

16. The intake system for an engine according to claim 15, wherein the valve opening control means closes the electrically driven side throttle valve in a manner delayed by a first time constant as the manually driven side throttle valves close.

17. The intake system for an engine according to claim 16, wherein the valve opening control means makes an opening of the electrically driven side throttle valve identical with an opening of the manually driven side throttle valves when a speed is lower than a predetermined control lower limit speed or a gear is in neutral.

18. The intake system for an engine according to claim 15, wherein the valve opening control means opens the electrically driven side throttle valve in a manner delayed by a second time constant as the manually driven side throttle valves open.

19. The intake system for an engine according to claim 18, wherein the valve opening control means makes an opening of the electrically driven side throttle valve identical with an opening of the manually driven side throttle valves when a speed is lower than a predetermined control lower limit speed or a gear is in neutral.

20. The intake system for an engine according to claim 15, wherein the valve opening control means makes an opening of the electrically driven side throttle valve identical with an opening of the manually driven side throttle valves when a speed is lower than a predetermined control lower limit speed or a gear is in neutral.

* * * * *